(12) United States Patent
Iwata et al.

(10) Patent No.: US 7,330,006 B2
(45) Date of Patent: Feb. 12, 2008

(54) POWER TOOL

(75) Inventors: Kazutaka Iwata, Hitachinaka (JP);
Shinichi Sakamoto, Hitachinaka (JP);
Tomoyoshi Yokota, Hitachinaka (JP);
Kenichirou Yoshida, Hitachinaka (JP);
Tomomasa Nishikawa, Hitachinaka (JP); Atsushi Nakagawa, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 90 days.

(21) Appl. No.: 11/406,373

(22) Filed: Apr. 19, 2006

(65) Prior Publication Data
US 2006/0255756 A1    Nov. 16, 2006

(30) Foreign Application Priority Data
Apr. 20, 2005    (JP)    ............................ P2005-121907

(51) Int. Cl.
*H02P 1/18*    (2006.01)
(52) U.S. Cl. ........................ 318/254; 318/138; 318/439; 388/937
(58) Field of Classification Search ................ 318/138, 318/254, 439; 388/935, 937
See application file for complete search history.

(56) References Cited

U.S. PATENT DOCUMENTS

| | | | |
|---|---|---|---|
| 5,099,160 A * | 3/1992 | Strozel et al. ................ 310/56 |
| 5,939,807 A * | 8/1999 | Patyk et al. ................... 310/89 |
| 6,127,751 A | 10/2000 | Kristen et al. | |
| 6,320,286 B1 * | 11/2001 | Ramarathnam .............. 310/50 |
| 2004/0124721 A1 | 7/2004 | Pfisterer et al. | |

FOREIGN PATENT DOCUMENTS

| | | |
|---|---|---|
| FR | 2 575 057 | 6/1986 |
| JP | 2004-015956 | 1/2004 |

* cited by examiner

*Primary Examiner*—Rina Duda
(74) *Attorney, Agent, or Firm*—Antonelli, Terry, Stout & Kraus, LLP.

(57) ABSTRACT

A power tool includes a brushless motor, a cooling fan, and a driving unit in a housing. The brushless motor is provided in the housing and having a rotary shaft. The cooling fan is attached to the rotary shaft in the housing, and rotatable together with the rotary shaft. The driving unit is provided in the housing for driving the motor. The driving unit includes an inverter circuit having a circuit board and a plurality of switching elements mounted on the circuit board. The circuit board is positioned on an opposite side to the motor with respect to the cooling fan. The plurality of switching elements is positioned around the cooling fan in a circumferential direction about the rotary shaft.

11 Claims, 5 Drawing Sheets

POWER TOOL

TECHNICAL FIELD

The present invention relates to a power tool having a brushless motor and a motor drive circuit for driving the brushless motor in a housing.

BACKGROUND

A brushless motor having high efficiency is used as a driving source for a power tool. A motor drive circuit for driving the power tool is provided separately from the brushless motor in a housing. The motor drive circuit is constituted by an inverter circuit having a plurality of switching elements such as a transistor and a field-effect transistor (hereinafter, abbreviated as "FET").

A high current flows through switching elements, and switching operation is performed at high frequency in the inverter circuit, thereby increasing an amount of heat generated by the switching elements. Therefore, cooling the inverter circuit forcibly is required. To forcibly cool the inverter circuit, a cooling fan to cool switching elements is used as one example. The cooling-air path is defined by forming inlet and exhaust ports on the housing. The switching elements are arranged in the cooling-air path for the forcibly cooling.

Japanese Patent Application Publication No. 2004-015956 discloses that switching elements and a cooling fan are arranged in an axial direction of the motor so that cooling-air is directly sent to the switching elements in order to cool the switching elements more effectively. As a result, the inverter circuit is forcibly cooled down.

Nowadays, downsizing of power tools is highly required in terms of operability in a narrow work space and portability. In particular, downsizing of an entire motor section accommodating the brushless motor and the inverter circuit in the power tool is a subject to be solved.

Power tools are often used in dusty-air environments including iron-powders and wooden powders. Therefore, entry of the dust into the housing should be restricted, which imposes various restrictions on a size and a position of ventilation holes.

The structure in which the switching elements are arranged on the cooling-air path requires securing of larger amount of blowing air. Therefore, a larger-sized cooling fan and larger-sized ventilation holes need to be provided.

However, the securing of a larger amount of blowing air often leads to easy entry of dust such as iron powders and wood powders into the housing, thereby lowering the dust resistance of the power tool. Further a use of the larger-sized fan may increase windage loss of the fan, thereby decreasing motor efficiency.

An object thereof is to provide a power tool which can easily and readily cool a driving circuit therein while preventing entry of dust to a housing and downsizing the power tool.

SUMMARY

The present invention provides a power tool including a housing, a brushless motor, a cooling fan, and a driving unit. The brushless motor is provided in the housing and having a rotary shaft. The cooling fan is attached to the rotary shaft in the housing, and rotatable together with the rotary shaft. The driving unit is provided in the housing for driving the motor. The driving unit includes an inverter circuit having a circuit board and a plurality of switching elements mounted on the circuit board. The circuit board is positioned on an opposite side to the motor with respect to the cooling fan. The plurality of switching elements is positioned around the cooling fan in a circumferential direction about the rotary shaft.

The present invention provides a power tool including a housing, a brushless motor, a cooling fan, and a driving unit. The housing includes a barrel portion and an end portion. The barrel portion has a plurality of first openings. The end portion has a second opening. The brushless motor is provided in the housing and has a rotary shaft extending in an axial direction of the barrel portion. The cooling fan is installed in the housing. The cooling fan includes a fan shaft and a fan blade extending from the fan shaft in a radial direction thereof. The fan shaft is aligned and attached to the rotary shaft, and rotatable together with the rotary shaft. The fan blade has a radially outer edge. The driving unit is provided in the housing for driving the brushless motor. The driving circuit includes a circuit board and a plurality of switching elements mounted on the circuit board. The circuit board has a third opening substantially at a center thereof, and is positioned on an opposite side to the brushless motor with respect to the cooling fan to direct the third opening to the second opening. The plurality of switching elements is positioned outside of the radially outer edge. An air flow is generated to cool the plurality of switching elements between the plurality of first openings and the second opening through the third opening.

BRIEF DESCRIPTION OF THE DRAWINGS

The aforementioned aspects and other features of the invention are explained in the following description, taken in connection with the accompanying drawing figures wherein.

DETAILED DESCRIPTION

Embodiments of the present invention will be described below with reference to the accompanying drawings.

Figure 1:
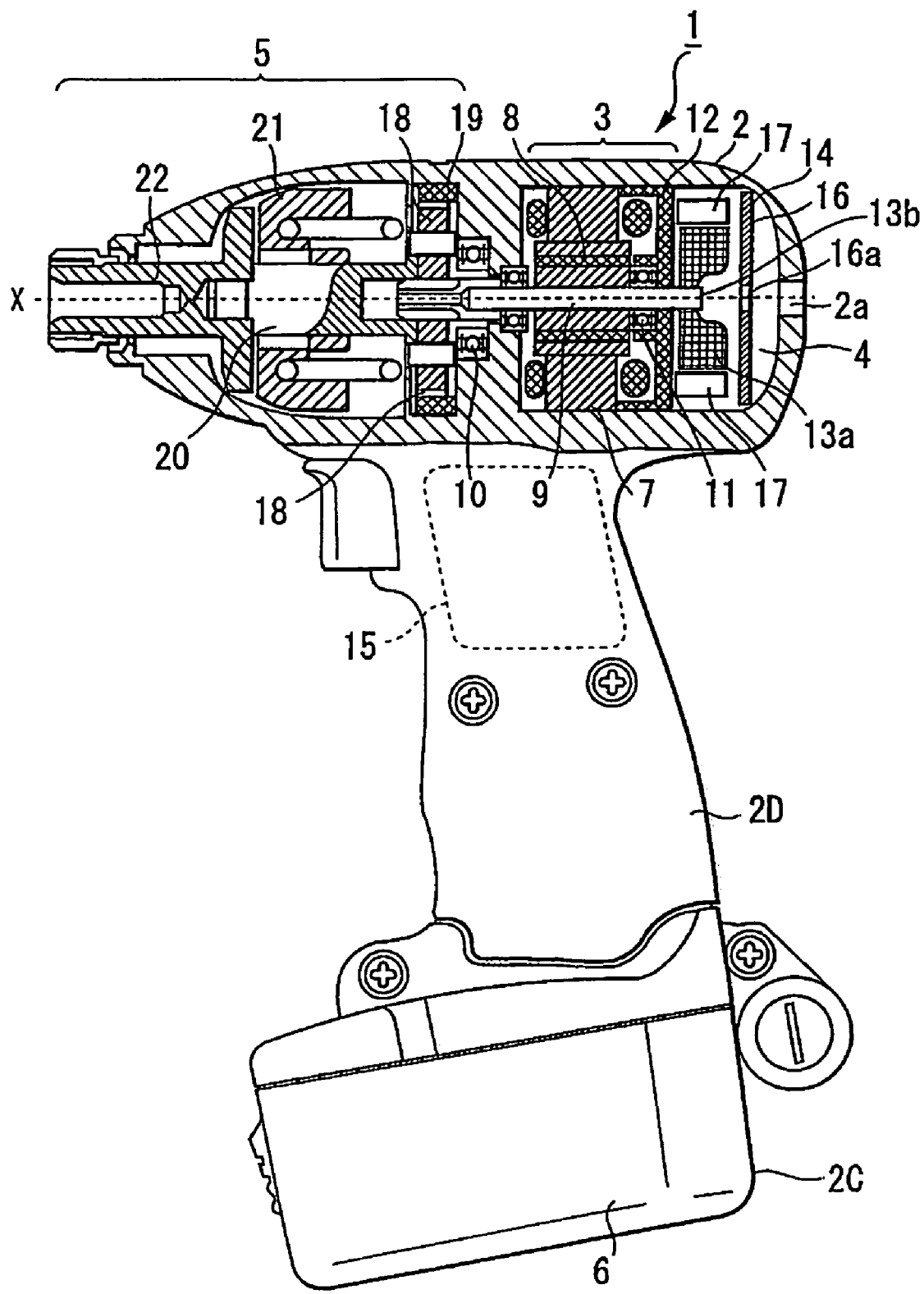
FIG. 1 is a partially sectional view of an impact driver according to a first embodiment of the present invention.

FIG. 1 shows a battery-powered impact driver 1 according to a first embodiment of the invention. Referring to FIG. 1, the impact driver 1 includes a brushless motor 3, a cooling fan 13 driven by the brushless motor 3, and a motor drive circuit 4 for driving the brushless motor 3 in a barrel portion 2A of a housing 2. The impact driver 1 further includes a power transmission mechanism section 5 for transmitting rotation power of the brushless motor 3 in the housing 2.

The brushless motor 3 receives electric power from a rechargeable battery 6 installed in a battery portion 2C of the housing 2 to rotate. The brushless motor 3 has a stator 7 fixed to an inner circumference of the housing 2 and a rotor 8 rotatably provided inside the stator 7. The brushless motor 3 has a rotary shaft 9 fixed to the rotor 8. The rotary shaft 9 extends substantially in an axial direction X of the barrel portion 2A. The rotary shaft 9 has two end portions rotatably supported by bearings 10 and 11, respectively. The bearings 10 and 11 are supported by a part of the housing 2 and a bearing holder 12 fitted to the barrel portion 2A, respectively.

Figure 2:
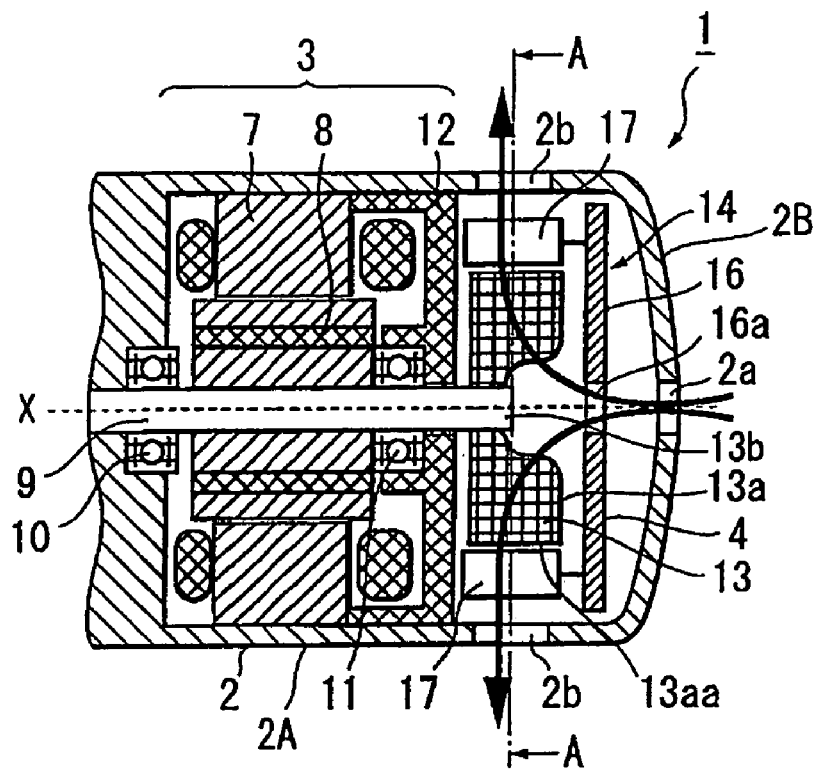
FIG. 2 is a cross-sectional view showing the main part of the impact driver shown in FIG. 1.
Figure 3:
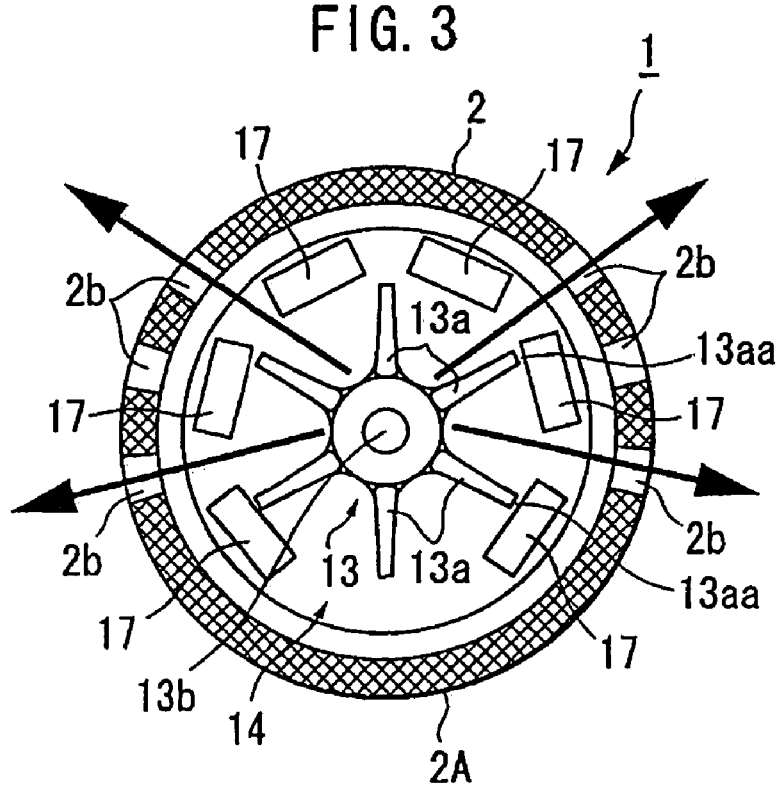
FIG. 3 is a cross-sectional view taken along lines of A-A of FIG. 2.

Referring to FIGS. 1 and 3, the cooling fan 13 has a shaft 13b and a plurality of blades 13a radially extending from the shaft 13b and arranged at regularly angular intervals in a circumferential direction about the shaft 13b. The cooling fan 13 is a radial fan. Alternatively, the cooling fan 13 may be an axial fan depending on an application therefor. In this embodiment, the cooling fan 13 has six blades 13a. Each blade 13a has a radially outer edge 13aa. Referring to FIGS. 1 and 2, the shaft 13b is fixed to and aligned with the rotary shaft 9 which protrudes from the bearing holder 12 toward the end portion 2B. Therefore, the cooling fan 13 is positioned between the brushless motor 3 and the end portion 2B in the axial direction X of the barrel portion 2A.

Figure 4:
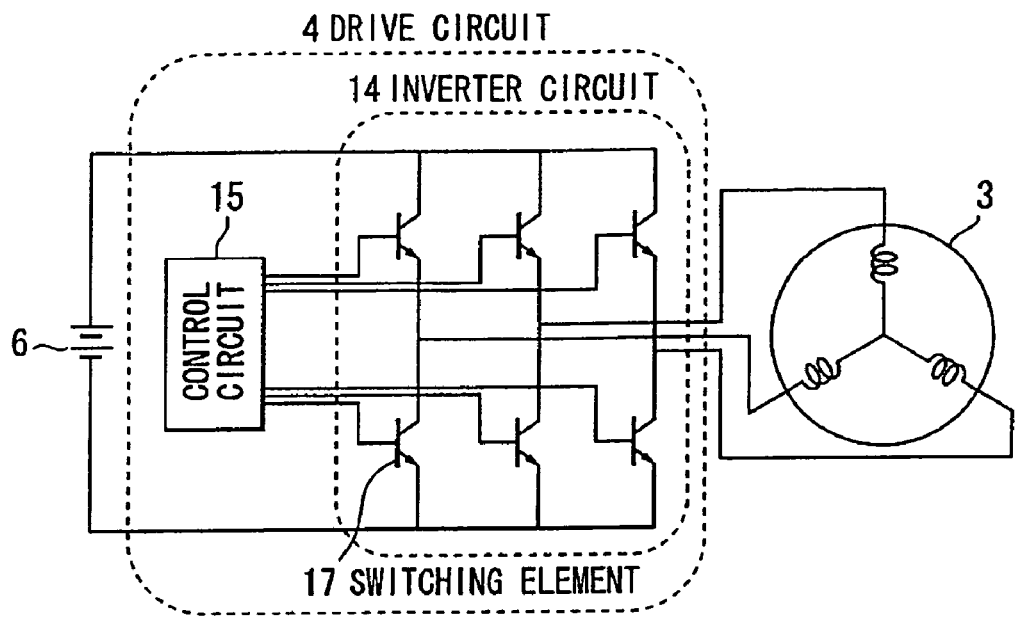
FIG. 4 is an electric circuit diagram showing a driving circuit for a brushless motor mounted in the impact driver shown in FIG. 1.

As shown in FIG. 4, the motor drive circuit 4 includes an inverter circuit 14 and a control circuit 15 for controlling the inverter circuit 14. The inverter circuit 14 includes a plurality of switching elements 17 to convert direct-current (DC) power supplied from the battery 6 into high-frequency Alternating-current (AC) power for the brushless motor 3 by means of switching operations of the switching elements 17. The control circuit 15 controls the switching operation of each switching element 17. In this embodiment, the switching element 17 includes a semiconductor device such as a transistor or an FET. Each switching element 17 has a box shaped member including the semiconductor device and wiring terminals on one end of the box shaped member.

As shown in FIG. 1, the motor drive circuit 4 is installed in the barrel portion 2A and a handle portion 2D connecting the barrel portion 2A to the battery portion 2C. The motor drive circuit 4 includes a circular circuit board 16 for mounting the switching elements 17 thereon. The control circuit 15 is accommodated in the handle portion 2D.

In this embodiment, as shown in FIGS. 1 to 3, the circuit board 16 has a circular ventilating hole 16a formed at the center thereof. The switching elements 17 are mounted on one main surface of the circuit board 16 at constant angular intervals and in a circumferential direction about the circular ventilating hole 16a.

As shown in FIG. 2, the circuit board 16 mounted with the switching elements 17 is installed between the brushless motor 3 and the end portion 2B in the barrel portion 2A so that the ventilating hole 16a is positioned substantially coaxially with the shaft 13b of the cooling fan 13 and the switching elements 17 are positioned surrounding the outer edges 13aa of the cooling fan 13. In other words, the circuit board 16 is accommodated in the housing 2 so that the switching elements 17 are positioned to surround all the blades 13a of the cooling fan 13 in a plane substantially perpendicular to the rotary shaft 9 of the brushless motor 3.

As described above, the circuit board 16 is positioned on an opposite side to the brushless motor 3 with respect to the cooling fan 13 in the axial direction X of the barrel portion 2A. The switching elements 17 are positioned in a radial direction of the rotary shaft 9 outside of the blades 13a. In this embodiment, the switching elements 17 and the cooling fan 13 lie in a plane substantially perpendicular to the rotary shaft 9 of the brushless motor 3.

Referring to FIGS. 1 and 2, a plurality of circular exhaust ports 2b is formed in the barrel portion 2A in the circumferential direction thereof to face the switching elements 17. In this embodiment, as shown in FIG. 3, six exhaust ports 2b are formed in the barrel portion 2A.

A circular inlet port 2a is formed at the center of the end portion 2B to face the ventilating hole 16a of the circuit board 16. Accordingly, the circuit board 16 functions as a fan guide to define an air flow in the housing 2.

The power transmission mechanism section 5 is constituted by a reduction mechanism section, an impact mechanism section, and an anvil 22. The reduction mechanism section includes a planet gear 18 and a ring gear 19. The impact mechanism section includes a spindle 20 and a hammer 21 provided on the spindle 20 and movable in a back-and-forth direction. The anvil 22 is configured to hold a point tool (not shown).

An Operation of the impact driver 1 having the above configuration will be described as follow.

In a screw-tightening operation, the motor drive circuit 4 receives power from the rechargeable battery 6 to drive the brushless motor 3. Then, the rotary shaft 9 of the brushless motor 3 is rotated at a predetermined speed. A torque of the rotary shaft 9 is transmitted to the spindle 20 while being decelerated by the planet gear 18 and ring gear 19 to rotate the spindle 20 at a predetermined speed. Then, a torque of the spindle 20 is transmitted to the anvil 22 to rotate the point tool attached to the anvil 22, thereby tightening a screw. At the same time, when a torque greater than a predetermined value acts on the hammer 21 during the screw-tightening operation, the torque of the spindle 20 is converted into a striking force of the hammer 21. The striking force is then transmitted to the point tool through the anvil 22. Both of the torque and the striking force are imparted to the point tool, thereby enabling the point tool to perform a desired screw-tightening operation.

Generally, the brushless motor 3 and the motor drive circuit 4 generate heat as the brushless motor 3 rotates. In particular, a large amount of current flows through the switching elements 17 in the motor drive circuit 4, and the switching elements 17 perform the switching operation at high frequency, increasing an amount of heat generated by the switching elements. Thus, the cooling of the switching elements 17 is required.

The cooling fan 13 rotated together with the rotary shaft 9 of the brushless motor 3 draws cooling-air into the housing 2 through the inlet port 2a as denoted by the arrows in FIG. 2. The drawn cooling-air passes through the ventilating hole 16a in the circuit board 16 and is sucked into the central portion of the cooling fan 13. At this time, the circuit board 16 serves as a fan guide to guide the cooling-air to the central portion of the cooling fan 13. Because of the ventilating hole 16a, an air flow from the inlet port 2a to the exhaust ports 2b is defined and regulated to pass through the ventilating hole 16a. This structure assists the cooling of the switching elements 17 efficiently.

The cooling-air guided to the central portion of the cooling fan 13 is provided with kinetic energy to be oriented outward in a radial direction of the cooling fan 13. The cooling-air passes by and cools the switching elements 17, and is discharged to the atmosphere through the exhaust ports 2b of the housing 2.

As described above, the plurality of switching elements 17 are continuously cooled down by the cooling-air generated by the rotation of the brushless motor 3. In this embodiment, the plurality of switching elements 17 are positioned around the cooling fan 13 in the barrel portion 2A so as to face the cooling fan 13 in the vertical direction. Therefore, the length of the axial direction of the barrel portion 2A accommodating the brushless motor 3 and motor drive circuit 4 can be shortened. The impact driver 1 can be downsized.

Further, the switching elements 17 are located directly on the leeward of the cooling fan 13, so that high-speed cooling-air strikes on the switching elements 17. Therefore, the switching elements 17 are effectively cooled down and a rise in the temperature of the switching elements 17 can be suppressed.

In this embodiment, the plurality of the switching elements 17 are arranged at substantially equal angular intervals. Further, the plurality of exhaust ports 2b are formed on the barrel portion 2A to surround the switching elements 17. With this structure, the switching elements 17 are cooled down effectively and uniformly by the cooling-air so that a rise in the temperature of the switching elements 17 can be suppressed. Therefore, an opening area of each inlet port 2a can be minimized. Design for an air-passage is facilitated. Further, entry of the dust such as iron powders or wood powders into the housing 2 can be prevented, compared with a conventional structure in that heating members such as the switching elements 17 are simply provided on a straight cooling-air path.

As described above, an increase in the cooling efficiency eliminates the need to increase the size of the cooling fan, resulting in reduced windage loss and increased motor efficiency.

Further, in this embodiment, the circuit board 16 serves as a fan guide to regulate the flow of the cooling-air, thereby enhancing and assisting the heat radiation from the switching elements 17. There is no need to provide an additional member serving as the fan guide. Therefore, both the manufacturing cost and size of the impact driver 1 can be reduced.

Figure 5:
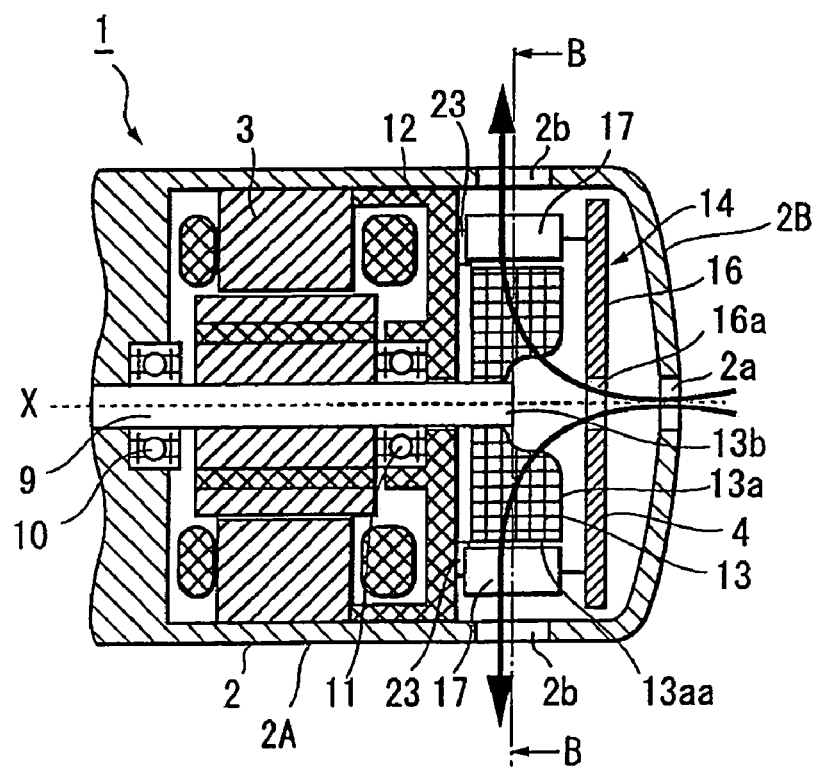
FIG. 5 is a cross-sectional view showing a main part of an impact driver according to a second embodiment of the present invention.
Figure 6:
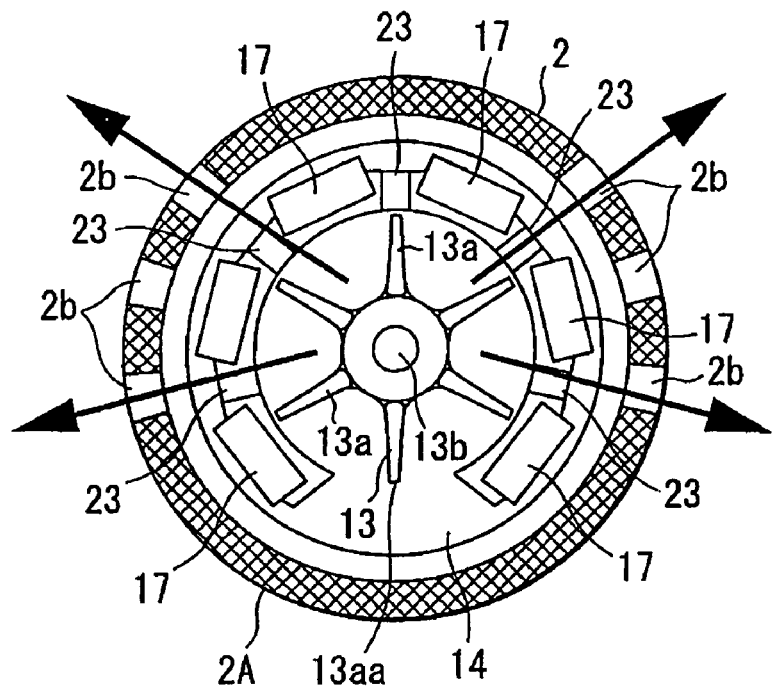
FIG. 6 is a cross-sectional view taken along lines of B-B of FIG. 5.

An impact driver of a second embodiment of the present invention will be described with reference to FIGS. 5 and 6. In FIGS. 5 and 6, like elements in FIGS. 1 and 4 are identified by the same reference numerals, and the descriptions thereof will be omitted hereinafter.

In this embodiment, the switching elements 17 are fixed to a metallic radiation fin 23. The radiation fin 23 is integrally formed with the bearing holder 12.

According to the second embodiment, the switching elements 17 are also fixed to a metallic radiation fin 23, so that heat generated by the switching elements 17 is transmitted to the radiation fin 23 to perform heat radiation effectively, thereby improving and enhancing the cooling effect for the switching elements 17. Further, the integral formation of the radiation fin 23 and the bearing holder 12 increases the heat capacity of the radiation fin 23, thereby improving and enhancing the cooling effect for the switching elements 17.

When the bearing holder 12 is formed from a heat insulation material, heat transmission from the brushless motor 3 to the motor drive circuit 4 can be prevented, thereby preventing the temperature of the switching elements 17 from rising due to the heat generated by the brushless motor 3. This structure is effective when the heating value of the brushless motor 3 is higher than the total heating value of the switching elements 17.

Other configurations are the same as those of the first embodiment so that the impact drive of the second embodiment achieves the same advantages as those of the first embodiment.

Figure 7:
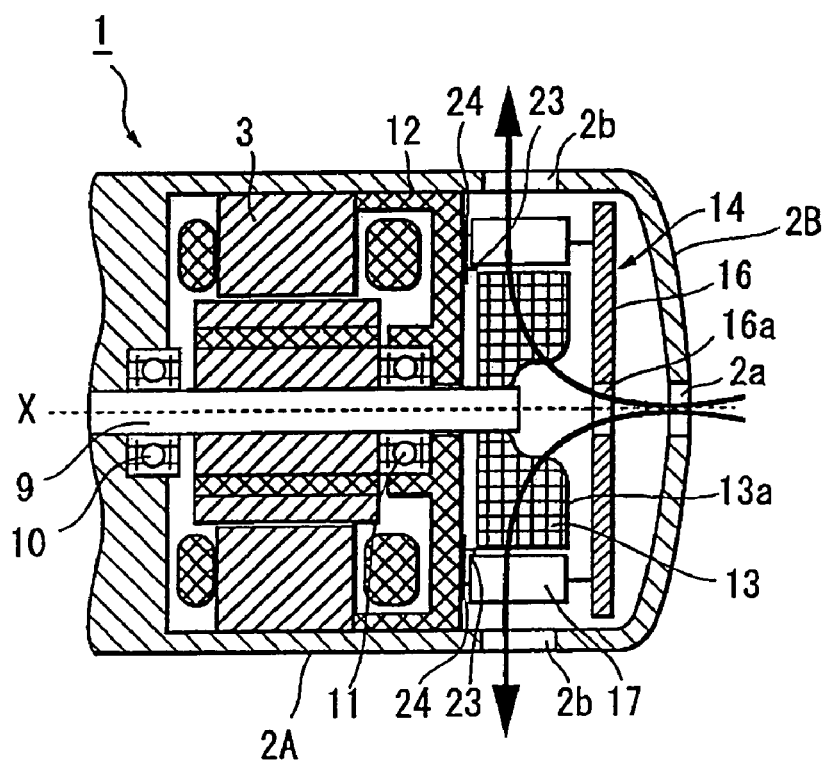
FIG. 7 is a cross-sectional view showing a main part of an impact driver according to a third embodiment of the present invention.

An impact driver of a third embodiment of the present invention will be described with reference to FIG. 7. In FIG. 7, similar elements to those in FIG. 5 are identified by the same reference numerals, and the descriptions thereof are omitted.

In this embodiment, the switching elements 17 are fixed to a metallic radiation fin 23. The bearing holder 12 is formed from a metallic member. A heat insulation material 24 is inserted between the bearing holder 12 and radiation fin 23.

With this structure, when the bearing holder 12 is formed from a metallic member, considering the durability and accuracy of the bearing holder 12, the heat insulation material 24 between the bearing holder 12 and radiation fin 23 prevents heat conduction from the brushless motor 3 to the switching elements 17. Therefore, rise in the temperature of the switching elements 17 due to the heat generated in the brushless motor 3 can be prevented. Other configurations are the same as those of the first embodiment so that the impact driver of the third embodiment achieves the same effects as those of the first embodiment.

Figure 8:
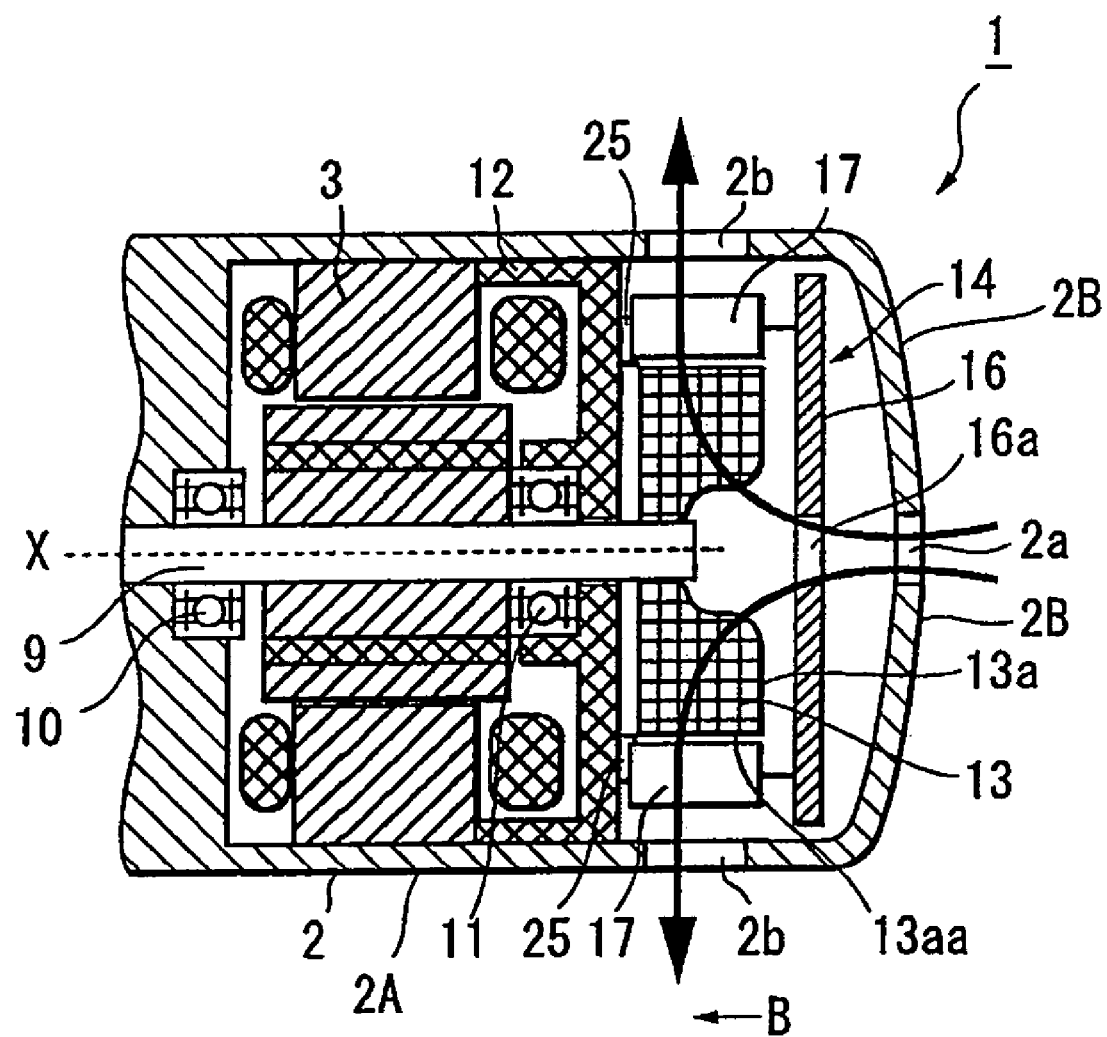
FIG. 8 is a cross-sectional view showing a main part of an impact driver according to a fourth embodiment of the present invention.

An impact driver of a fourth embodiment of the present invention will be described with reference to FIG. 8. In FIG. 8, similar elements in FIG. 5 are identified by the same reference numerals as those in FIG. 5, and the descriptions thereof will be omitted.

In this embodiment, the bearing holder 12 is formed from a metallic member. The tip ends of the switching elements 17 are fixed to the bearing holder 12 through a heat insulation member 25. In other words, the switching elements 17 is fixed between the bearing holder 12 and the circuit board 16 by means of the tip end and the other end, respectively.

With this structure, the arrangement of the switching elements 17 in the barrel portion 2A is readily performed without being affected by heat generated by the switching element 17 itself or the brushless motor 3, thereby preventing the switching elements 17 from slanting toward the cooling fan 13. Other configurations are the same as those of the first embodiment so that the impact drive of the fourth embodiment can achieve the same effects as those of the first embodiment.

In the above embodiments, the rechargeable battery 6 is used as a power source for driving the brushless motor 3. Instead of the brushless motor 3, a commercial power source for domestic use can be used.

In the above embodiments, the brushless motor 3 is a radial fan. Instead of the radial fan, an axial fan can be used as a cooling fan 13. In this case, the switching elements 17 are positioned on the windward side of the cooling fan 13, because an air flow passes from the ports 2b to the port 2a through the ventilating hole 16a. The air flow strikes on each switching element 17 so that the switching element 17 is cooled down and heat generated by the switching element 17 is dissipated efficiently. This structure ensures the same advantages as those of the first embodiment.

The present invention is applicable to any other type of power tool having the brushless motor and motor drive circuit as well as the impact driver described above.

It is understood that the foregoing description and accompanying drawings set forth the embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

What is claimed is:

1. A power tool comprising:
   a housing;
   a brushless motor provided in the housing and having a rotary shaft;
   a cooling fan attached to the rotary shaft in the housing and being rotatable together with the rotary shaft; and
   a driving unit provided in the housing for driving the motor and comprising an inverter circuit having a circuit board and a plurality of switching elements mounted on the circuit board, the circuit board being positioned on an opposite side to the motor with respect to the cooling fan, and the plurality of switching elements being positioned around the cooling fan in a circumferential direction about the rotary shaft.

2. The power tool as claimed in claim 1, wherein the plurality of switching elements and the cooling fan lie in a plane substantially perpendicular to the rotary shaft.

3. The power tool as claimed in claim 1, wherein the plurality of switching elements is positioned at substantially regular intervals in the circumferential direction, and wherein the housing is provided with a plurality of exhaust ports in proximity to the plurality of switching elements.

4. The power tool as claimed in claim 1, wherein the circuit board is provided with a ventilating port at a substantially center thereof, the ventilating port and the circuit board have geometrical relationship with each other so as to function the circuit board as a fan-guide.

5. The power tool as claimed in claim 1, further comprising a metallic heat radiating fin, the plurality of switching elements being also attached to the heat radiating fin.

6. The power tool as claimed in claim 5, further comprising
   a bearing rotatably supporting the rotary shaft; and
   a bearing holder provided in the housing to hold the bearing, the bearing holder being integrally coupled with the heat radiating fin.

7. The power tool as claimed in claim 6, wherein the bearing holder is made from a heat insulating material.

8. The power tool as claimed in claim 6, further comprising a heat insulating member provided between the bearing holder and the heat radiating fin, wherein the bearing holder is made from a metal.

9. The power tool as claimed in claim 6, wherein the bearing holder is made from a metal, and the plurality of switching elements is fixed to the heat radiating fin through a thermally insulating member.

10. The power tool as claimed in claim 4, wherein the housing is provided with an inlet port facing the ventilating port for drawing air into the housing.

11. A power tool comprising:
    a housing comprising a barrel portion and an end portion, the barrel portion having a plurality of first openings, and the end portion having a second opening;
    a brushless motor provided in the housing and having a rotary shaft extending in an axial direction of the barrel portion;
    a cooling fan installed in the housing and comprising a fan shaft and a fan blade extending from the fan shaft in a radial direction thereof, the fan shaft being aligned and attached to the rotary shaft and being rotatable together with the rotary shaft, the fan blade having a radially outer edge; and
    a driving circuit provided in the housing for driving the brushless motor, the driving circuit comprising a circuit board and a plurality of switching elements mounted on the circuit board, the circuit board having a third opening substantially at a center thereof and being positioned on an opposite side to the brushless motor with respect to the cooling fan to direct the third opening to the second opening, the plurality of switching elements being positioned outside of the radially outer edge, wherein an air flow is generated to cool the plurality of switching elements between the plurality of first openings and the second opening through the third opening.

* * * * *